(12) United States Patent
Gonioukh et al.

(10) Patent No.: US 7,737,229 B2
(45) Date of Patent: Jun. 15, 2010

(54) CONTINUOUS PREPARATION OF ETHYLENE HOMOPOLYMERS OR COPOLYMERS

(75) Inventors: Andrei Gonioukh, Erftstadt-Liblar (DE); Gernot Köhler, Meckenheim (DE); Theo Teuber, Erftstadt (DE); Thomas Dröge, Neustadt a. d. W. (DE)

(73) Assignee: Basell Polyolefine GmbH, Wesseling (DE)

( * ) Notice: Subject to any disclaimer, the term of this patent is extended or adjusted under 35 U.S.C. 154(b) by 906 days.

(21) Appl. No.: 10/577,695

(22) PCT Filed: Oct. 27, 2004

(86) PCT No.: PCT/EP2004/012108

§ 371 (c)(1),
(2), (4) Date: Apr. 28, 2006

(87) PCT Pub. No.: WO2005/049664

PCT Pub. Date: Jun. 2, 2005

(65) Prior Publication Data

US 2007/0123678 A1 May 31, 2007

Related U.S. Application Data

(60) Provisional application No. 60/525,268, filed on Nov. 25, 2003.

(30) Foreign Application Priority Data

Oct. 31, 2003 (DE) ................................ 103 51 262

(51) Int. Cl.
*C08F 2/00* (2006.01)
*C08F 10/14* (2006.01)

(52) U.S. Cl. .............................. 526/64; 526/65; 526/73; 526/348.2

(58) Field of Classification Search ................... 526/64, 526/65, 73, 348.2
See application file for complete search history.

(56) References Cited

U.S. PATENT DOCUMENTS 3,275,615 A   9/1966   Krulisch (Continued)

FOREIGN PATENT DOCUMENTS

DE      4102808       1/1991

(Continued)

OTHER PUBLICATIONS

Ullmann's Encyclopedia der technischen Chemie, 4$^{th}$ Edition, vol. 19, p. 169-178 (1980).

*Primary Examiner*—William K Cheung
(74) *Attorney, Agent, or Firm*—Shao-Hua Guo

(57) ABSTRACT

The invention relates to a process for the continuous preparation of ethylene homopolymers or copolymers in the presence of free-radical polymerization initiators and, if desired, molecular weight regulators at from 120° C. to 350° C. and pressures in the range from 100 to 4000 bar, in which the polymer is separated from unpolymerized ethylene in a high-pressure stage at a pressure of from 100 to 500 bar and at least one low-pressure stage at a pressure of from 1 to 100 bar and the ethylene separated off in the high-pressure stage is separated from remaining monomeric, oligomeric and/or polymeric constituents and recirculated to the inlet of the tube reactor in a high-pressure circuit and the ethylene separated off in the low-pressure stage is separated from remaining monomeric, oligomeric and/or polymeric constituents and recirculated to the inlet of the tube reactor in a low-pressure circuit. The initiator is used as a solution in an isoparaffinic solvent having a boiling point of not more than 160° C. and the solvent is separated from the other monomeric, oligomeric and/or polymeric constituents in the low-pressure circuit. The solvent is then, if appropriate after being admixed with fresh solvent, reused for dissolving initiator.

10 Claims, 1 Drawing Sheet

U.S. PATENT DOCUMENTS

| | | | |
|---|---|---|---|
| 5,100,978 A | 3/1992 | Hansenbein et al. | |
| 6,355,741 B1 * | 3/2002 | Marechal | 526/64 |
| 2003/0008982 A1 | 1/2003 | Mahling et al. | |
| 2004/0181015 A1 * | 9/2004 | Deckers et al. | 526/64 |

FOREIGN PATENT DOCUMENTS

| | | |
|---|---|---|
| EP | 394794 | 3/1992 |
| EP | 567818 | 3/1992 |
| EP | 449092 | 11/1994 |
| FR | 2362869 | 3/1978 |
| GB | 823932 | 6/1956 |
| GB | 1558883 | 8/1976 |
| WO | WO 03/018646 A1 * | 6/2003 |

* cited by examiner

Fig.
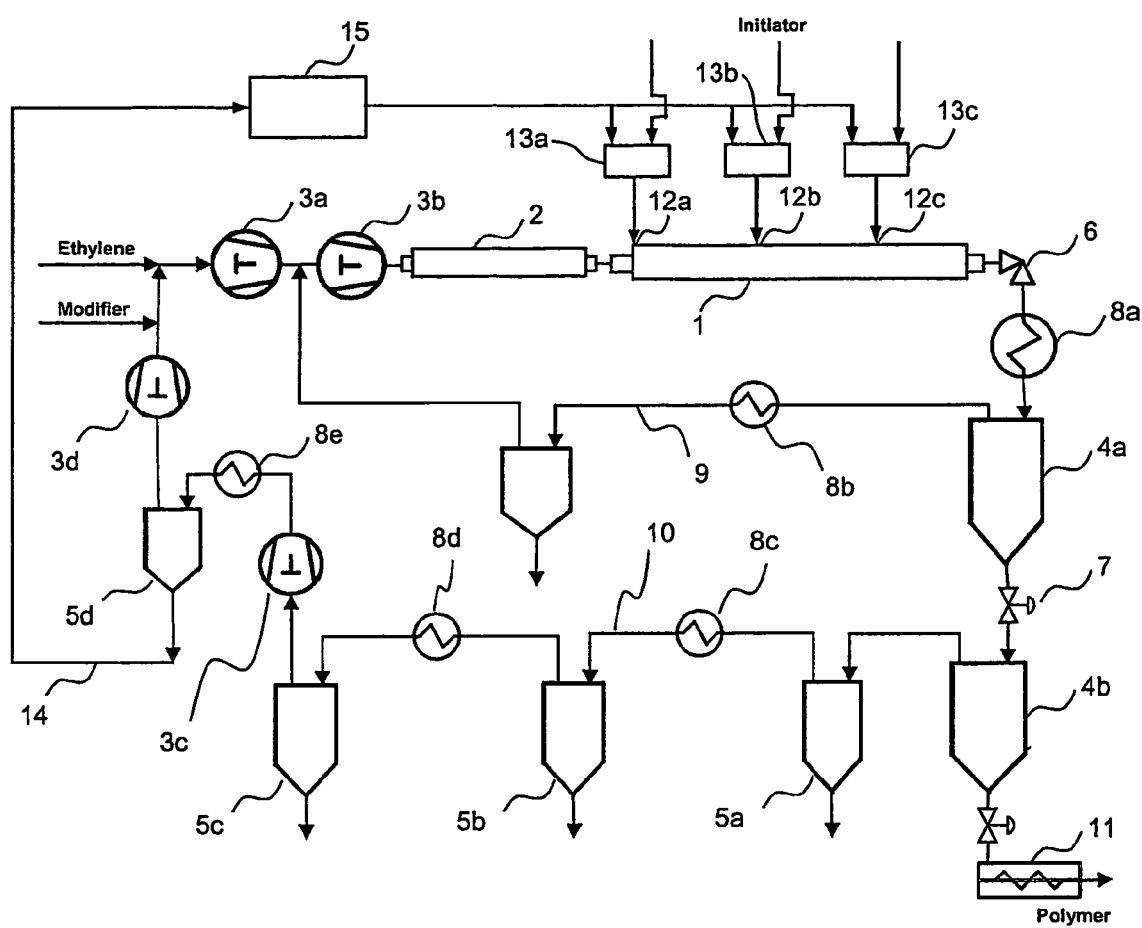

CONTINUOUS PREPARATION OF ETHYLENE HOMOPOLYMERS OR COPOLYMERS

The present invention relates to a process for the continuous preparation of ethylene homopolymers or copolymers in the presence of free-radical polymerization initiators and, if desired, molecular weight regulators at from 120° C. to 350° C. and pressures in the range from 100 to 4000 bar, in which the polymer is separated from unpolymerized ethylene in a high-pressure stage at a pressure of from 100 to 500 bar and at least one low-pressure stage at a pressure of from 1 to 100 bar and the ethylene separated off in the high-pressure stage is separated from remaining monomeric, oligomeric and/or polymeric constituents and recirculated to the inlet of the tube reactor in a high-pressure circuit and the ethylene separated off in the low-pressure stage is separated from remaining monomeric, oligomeric and/or polymeric constituents and recirculated to the inlet of the tube reactor in a low-pressure circuit.

High pressure polymerization processes for preparing polyethylene and ethylene copolymers have been known for a long time (Ullmann's Encyclopädie der technischen Chemie, 4th edition, vol. 19/1980/pp.169-178). Processes carried out in high-pressure tube reactors are particularly widespread. Such processes are described, for example, in EP-A-449092, EP-A-394794, EP-B-567818 and DE-A-4102808. Here, the polymerization process is initiated by means of an initiator, for example peroxides or oxygen. The initiators are usually dissolved in an inert solvent such as isododecane (cf., for example, GB 1558883).

The use of relatively low-boiling paraffinic solvents for dissolving the initiators is also known. Thus, for example, U.S. Pat. No. 3,275,615 describes the use of hexane, cyclohexane, heptane, methylcyclohexane, isooctane or other saturated hydrocarbons as solvents. FR 2362869 discloses the use of isodecane.

However, all processes known hitherto have the disadvantage that the solvent is obtained in the low-pressure circuit together with other monomeric, oligomeric or polymeric constituents and therefore has to be disposed of, frequently does not meet explosion protection regulations or has an excessive adverse effect on the polyethylene product as residual solvent content or makes backventing in subsequent extrusion necessary.

It is an object of the present invention to overcome the abovementioned disadvantages of the prior art and provide a process in which the solvent used for the initiators in the high-pressure polymerization of ethylene can be largely recovered in a simple fashion.

We have found that this object is achieved by the polymerization initiators being used as a solution in an isoparaffinic solvent having a boiling point of not more than 160° C. and the solvent being separated from the other monomeric, oligomeric and/or polymeric constituents in the low-pressure circuit and being reused for dissolving initiator.

A first important factor for the success of the present invention is the use of an isoparaffinic solvent having a boiling point of not more than 160° C., preferably not more than 150° C., particularly preferably not more than 135° C., since the low boiling point makes it easier to recover the solvent according to the present invention while still ensuring high spontaneous ignition temperatures. According to the present invention, isoparaffinic solvents are all alkanes which have at least one branch. Mixtures of isoparaffinic solvents or fractions of these can also be used as long as the upper end of the boiling range is below 160° C. Furthermore, it is preferred that the isoparaffinic solvent comprises isoparaffins having not more than 10 carbon atoms, preferably from 5 to 9 and particularly preferably from 6 to 8 carbon atoms.

Preferred isoparaffinic solvents are 2-methylpentane, 3-methylpentane, 2,2-dimethylbutane, 2,3-dimethylbutane, 2-methylhexane, 3-methylhexane, 2,2-dimethylpentane, 2,3-dimethylpentane, 2,4-dimethylpentane, 3,3-dimethylpentane, 2-methylheptane, 2,2 dimethylhexane, 2,4-dimethylhexane, 2,5 dimethylhexane, 3,4-dimethylhexane, 2,2,4-trimethylpentane (isooctane), 2-methyloctane and mixtures thereof. The solvent used is particularly preferably a mixture of isoparaffins having a boiling range from 100 to 150° C., in particular from 110 to 140° C.

The recovery of the major part of the solvent makes it possible to employ even relatively expensive solvents which would otherwise not be feasible for economical operation.

The Initiators can be employed in each zone of the tube reactor, either individually or as a mixture, in concentrations of from 0.1 to 50 mol/t of polyethylerie produced, in particular from 0.2 to 20 mol/t. The initiator mixtures are present in the solutions in proportions of from 2 to 65% by weight, preferably from 5 to 40% by weight and particularly preferably from 10 to 30% by weight. Furthermore, particular preference is given to using mixtures of initiators which have different decomposition temperatures.

A second aspect which is important for the present invention is that the solvent is separated from the other monomeric, oligomeric and/or polymeric constituents in the low-pressure circuit In such a way that it is suitable for reuse as solvent for initiators.

The separation is preferably carried out by separating off the solvent in the low-pressure circuit by means of at least one first and one last gas-liquid separator which are connected in series, with the temperature being reduced from separator to separator so that the other monomeric, oligomeric or polymeric constituents are separated out in the first separator or separators and the solvent being separated out as liquid essentially in the last separator. The solvent is then, if appropriate in admixture with fresh solvent, reused for dissolving initiator.

As a result of the isoparaffinic solvent being separated from ethylene and any comonomers essentially in the last separator after the other high-boiling constituents have been separated off in the upstream separator or separators, preferably at least two separators, the solvent is obtained in a form which is not excessively contaminated with the other constituents. A relatively large amount of oligomeric or polymeric constituents can lead to the solvent no longer being able to be conveyed because of an excessively high viscosity, while contamination with molar mass regulators or other additives have an adverse effect on the product properties of the product on further use. The solvent is then taken from the last separator and is used again, either directly or after a simple purification, for dissolving further initiators. According to the present invention, it is not necessary for the solvent which has been separated off to be purified further and preference is therefore given to using the solvent which has been separated off without further purification for dissolving initiator.

Apart from the process engineering advantages of the present invention, there are also product improvements. Thus, the use of the solvent employed according to the present invention results in a lower residual solvent content in the polyethylene product, or at the same residual solvent content it is possible to omit the customary backventing in extrusion. Furthermore, the use of the isoparaffinic solvents employed according to the present invention makes it possible for part of the molar mass regulators customarily used, which are frequently also described as modifiers, to be replaced by the isoparaffinic solvent. Particularly when using polar substances (aldehydes, ketones, alcohols), this has the advantage that the organoleptic properties of the polymer product are improved considerably.

For safety reasons, preference is given to using an isoparaffinic solvent having a spontaneous ignition temperature in accordance with DIN 51794 of above 250° C. Particular preference is given to using an isoparaffinic solvent having a spontaneous ignition temperature of above 300° C., in particular 320° C. Furthermore, particular preference is given to isoparaffinic hydrocarbons having a boiling point of from not less than 60° C. to not more than 150° C., in particular from not less than 80° C. to not more than 135° C.

It is particularly advantageous for the pressure upstream of the last separator to be increased to such an extent that the solvent condenses while the ethylene remains in the gaseous state.

The process of the present invention can be used both for the homopolymerization of ethylene and for the copolymerization of ethylene with one or more other monomers, provided that these monomers can be copolymerized with ethylene by a free-radical mechanism under high pressure. Examples of suitable copolymerizable monomers are α,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or carboxylic anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and α-olefins such as propene, 1-butene, 1-pentene, 1-hexene, 1-octene or 1-decene. Furthermore, vinyl carboxylates, particularly preferably vinyl acetate, can also be used as comonomers. Particularly advantageous comonomers are n-butyl acrylate, acrylic acid and methacrylic acid. The proportion of comonomer or comonomers in the reaction mixture is from 0.1 to 45% by weight,.preferably from 3 to 30% by weight, based on the amount of ethylene. In the copolymerization, the further monomers are preferably fed in at a plurality of points along the reactor.

Initiation of the polymerization reaction using organic peroxides or azo compounds represents a preferred embodiment of the process of the present invention. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butylperoxy isopropyl carbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amylperoxy 2-ethylhexanoate, dibenzoyl peroxide, tert-butylperoxy 2-ethylhexanoate, tert-butylperoxy diethylacetate, tert-butylperoxy diethylisobutyrate, 1,1-di(tert-butylperoxy)-3,3,5-trimethylcyclohexane, 1,1-di-(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyltriperoxycyclononane or 2,2-di(tert-butylperoxy)butane. Azoalkanes (diazenes), azodicarboxylic esters, azodicarboxylic dinitriles such as azobisisobutyronitrile and also hydrocarbons which disintegrate into radicals and are also referred to as C—C initiators, e.g. 1,2-diphenyl-1,2-dimethylethane derivatives and 1,1,2,2-tetramethylethane derivatives, are also suitable. It is possible to use both individual initiators and, preferably, mixtures of various initiators. A wide range of initiators, in particular peroxides, are commercially available, for example the products sold by Akzo Nobel under the trade names Trigonox® or Perkadox®.

The polymerization is preferably carried out in a tube reactor having a plurality of reaction zones, more preferably 2-6 reaction zones, particularly preferably from 3 to 5 reaction zones. The polymerization is initiated in each polymerization zone by addition of initiators which decompose to form free radicals. The tube reactor preferably has a length-to-diameter ratio of >1000.

In the process of the present invention, the molar mass of the polymers prepared can be controlled in a customary fashion by addition of molecular weight regulators. Examples of suitable regulators are hydrogen, aliphatic and olefinic hydrocarbons such as propane, butane, pentane, hexane, cyclohexane, propene, 1-pentene, 1-hexene or 1-octene, ketones, such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. Particular preference is given to using saturated aliphatic aldehydes, in particular propionaldehyde, alkanes such as propane or α-olefins such as propene or 1-hexene. The molar mass regulator is preferably introduced into the reaction mixture upstream of the tube reactor. It can also be introduced together with the polymerization initiator at one or more points along the tube reactor. An advantage of the present invention is that the isoparaffinic solvents can also partly replace the molar mass regulator.

The process of the present invention is usually carried out at pressures of from 1000 to 4000 bar, with pressures of from 1800 to 3500 bar being preferred and pressures of from 2000 to 3300 bar being particularly preferred. The temperatures are generally in a range from 100 to 350° C. preferably from 140 to 340° C. and very particularly preferably from 150° C. to 330° C., with the copolymerization of ethylene with sensitive or strongly regulating comonomers, in particular free-radically polymerizable carboxylic esters such as vinyl esters, preferably being carried out at below 230° C. In general, preference is given to a process in which the polymerization temperature is not higher than 330° C.

The flowing reaction mixture generally contains polyethylene in an amount in the range from 0 to 45% by weight, based on the total weight of the monomers fed into the reactor, usually up to 40% by weight.

The present invention further provides an apparatus for the high-pressure polymerization of ethylene and, if desired, comonomers, which is suitable and preferred for carrying out the process of the present invention, comprising a) a high-pressure tube reactor which has at least one feed point for the monomer and at least one feed point for a solution of polymerization initiators, b) at least one mixing vessel for dissolving the polymerization initiators in an isoparaffinic solvent having a boiling point of not more than 160° C., which is connected to the feed point or points, c) a high-pressure stage and at least one low-pressure stage for separating unpolymerized reaction constituents from the polymer product, d) a high-pressure circuit for recirculating the monomer separated off in the high-pressure stage to the inlet of the tube reactor, e) a low-pressure circuit for recirculating the monomer separated off in the low-pressure stage, which circuit comprises at least one first separator for separating the other reaction constituents from the monomer and solvent and a last separator for separating the solvent from the monomer, with heat exchangers being provided between the separators, and f) a return line for recirculating the solvent from the last separator to the mixing vessel or vessels.

A collection vessel in which the recovered solvent is temporarily stored is preferably provided between return line and mixing vessel.

The invention is described in more detail below with the aid of the figure without being restricted to the embodiments described.

BRIEF DESCRIPTION OF THE DRAWING

The FIGURE schematically shows a continuous polymerization plant for preparing ethylene homopolymers or copolymers. The ethylene, which is usually under a pressure of 17 bar, is firstly compressed to a pressure of about 300 bar by means of a precompressor 3a and then compressed to the reaction pressure of about 3000 bar using an after-compressor 3b. After mixing with a suitable molar mass regulator, in this case propionaldehyde, and preheating to the reaction start temperature of from about 150 to 175° C., the reaction mixture is conveyed to the initiator feed points 12a, 12b, 12c of the tube reactor 1.

The tube reactor 1 comprises in principle a long tube having a length of 600 m and a diameter of 15 mm, which in the present case is divided into three reaction zones. The heat of reaction liberated is removed from the reaction mixture by means of a coolant circuit (not shown). At the beginning of each reaction zone, an Individual mixture of various organic peroxides which are dissolved in an isoparaffin fraction having a boiling range from 116 to 134° C. and a spontaneous ignition temperature above 300° C. is fed into the reactor. Each mixture has a composition such that an optimum temperature profile is established in the reactor, with the maximum permissible temperature of the reaction zone not being exceeded.

At the first initiator feed point 12a of the tube reactor 1, the initiators introduced are peroxides which decompose at low temperature, e.g. tert-butyl peroxypivalate (TBPP), tert-amyl peroxypivalate (TAPP), tert-butyl peroxyneodecanoate (TBPND) or tert-amyl peroxyneodecanoate (TAPND), one or more peroxides which decompose at intermediate temperatures, e.g. tert-butyl peroxy-2-ethylhexanoate (TBPEH), tert-butyl peroxy-3,5,5-trimethylhexanoate (TBPIN), 2,2-di(tert-butylperoxy)butane (BU-50), 1,1-di(tert-butylperoxy) cyclohexane (CH-50) and one or more peroxides which decompose at high temperatures, e.g. ditert-butyl peroxide (DTBP), tert-butyl hydroperoxide (TBHP), 3,6,9-triethyl-3, 6,9-trimethyl-1,4,7-triperoxonane (TETMTPN). At the second initiator feed point 12b, at which the reaction temperature has dropped back to 250° C. after the first temperature maximum, a mixture of one or more peroxides which decompose at intermediate temperature, e.g. tert-butyl peroxy-2-ethylhexanoate (TBPEH), tert-butyl peroxy-3,5,5-trimethylhexanoate (TBPIN), 2,2-di(tert-butylperoxy)butane (BU-50), 1,1-di(tert-butylperoxy)cyclohexane (CH-50), and one or more peroxides which decompose at high temperatures, e.g. ditert-butyl peroxide (DTBP), tert-butyl hydroperoxide (TBHP), 3,6,9-triethyl-3,6,9-trimethyl-1,4,7-triperoxonane (TETMTPN), is added.

At the third initiator feed point 12c, at which the reaction temperature has once again dropped to below 250° C. after the second temperature maximum, a mixture of one or more peroxides which decompose at intermediate temperatures, e.g. tert-butyl peroxy-2-ethylhexanoate (TBPEH), tert-butyl peroxy-3,5,5-trimethylhexanoate (TBPIN), 2,2-di(tert-butylperoxy)butane (BU-50), 1,1-di(tert-butylperoxy)cyclohexane (CH-50), and one or more peroxides which decompose at high temperatures, e.g. ditert-butyl peroxide (DTBP), tert-butyl hydroperoxide (TBHP), 3,6,9-triethyl-3,6,9-trimethyl-1,4,7-triperoxonane (TETMTPN), is added.

After leaving the tube reactor 1, the resulting polymer is separated off from unreacted ethylene and other low molecular weight compounds (monomers, oligomers, polymers, additives, solvent, etc) in a customar manner, by means of a high-pressure separator 4a and a low-pressure separator 4b and discharged and pelletized via an extruder 11 and granulator. In the extruder, backventing is customarily provided to reduce the residual solvent content further, but when using an isoparaffinic solvent having a boiling point of not more than 160° C. this can be omitted since the solvent content is sufficiently low even without further backventing.

The ethylene which has been separated off in the high-pressure separator 4a is freed of other constituents in at least one purification stage, preferably a plurality of purification stages, in the high-pressure circuit 9 at 300 bar and fed back into the inlet end of the tube reactor 1 between precompressor 3a and after-compressor 3b.

The ethylene which has been separated off in the low-pressure separator 4b, which further comprises, inter alia, the major part of the low molecular weight products of the polymerization (oligomers) and the solvent, is worked up at a pressure of from about 1.1 to 4 bar in a plurality of separators 5a, 5b, 5c, 5d, with a heat exchanger being located between each of the separators and a compressor 3c being located between separator 5c and separator 5d. The heat exchangers 8c, 8d, 8e serve to cool the reaction mixture from separator to separator so that fractionation of the constituents according to boiling point is achieved. In the first separators 5a to 5c, the ethylene together with the major part of the solvent is separated from the other constituents, with essential oligomers and polymers being obtained in the first separator 5a and the further constituents being separated off in the separators 5b and 5c. Finally, the ethylene/solvent mixture is compressed by means of the compressor 3c to such an extent that the solvent is removed from the ethylene at about 40° C. and 5 bar in the separator 5d. After a further compression stage 3d, the ethylene is fed to the suction side of the precompressor 3a.

The solvent recovered in the separator 5d is sufficiently pure for it to be able to be used together with fresh solvent for dissolving further initiator. It is conveyed via a return line 14 to a stock vessel and from there fed together with fresh solvent to the mixing vessels 13a, 13b, 13c and reused for dissolving the corresponding initiator mixture.

EXAMPLES

Example 1

Using the polymerization plant described with reference to the figure, ethylene polymers having different densities and MFR were prepared using propionaldehyde (PA) as molar mass regulator. As solvents for the peroxide initiator mixtures, use was made of an isoparaffin fraction having a boiling range from 116 to 134° C. (IP). The recovered solvent was used in a 1:1 mixture with fresh solvent for the dissolution of the peroxide initiator mixtures. The solvent contained small amounts of low molecular weight polymerization products as impurities, but these did not adversely affect reuse.

Comparative Example A

Comparative Example A was carried out under conditions identical to those in Example 1, but isododecane (IDD) was used instead of the low-boiling isoparaffin mixture as solvent for the peroxides.

The melt flow rate (MFR) of the resulting polymers was measured at 190° C. under a load of 2.16 kg in accordance with ISO 1133. The density was determined in accordance with ISO 1183. The distribution of the solvent over the separators 5b, 5c and 5d in Example 1 and Comparative Example A, can be seen in Tabelle 2. While in Example I the isooctane is obtained virtually exclusively in separator 5d, the isododecane is distributed over the three separators 5b, 5c and 5d and is additionally mixed with the molar mass regulator and waxes. The proportion of molar mass regulators is so high that the solvent is not suitable for the dissolution of initiator without prior purification. Furthermore, the waxes present in the solvent greatly reduce the flowability on compression.

TABLE 1

| Example | Polymer density g/cm$^3$ | MFR g/10 min | Conversion % | Solvent used Type | Amount of fresh solvent kg/t of PE | Amount of recycled solvent kg/t of PE | Molar mass regulator Type | Amount kg/t of PE |
|---|---|---|---|---|---|---|---|---|
| 1 | 0.9240 | 0.8 | 25.9 | IP | 8.2 | 8.2 | PA | 0.8 |
| A | Polymerization not possible* | | | IDD | 7.5 | 7.5 | PA | |

*Initiator solution was not able to be pumped

TABLE 2

Distribution of the solvent over the separators

| | | Comp. Example A | Example 1 |
|---|---|---|---|
| Separator 5b | Amount separated off, l/24 h | 101.6 | 1.3 |
| | Solvent, % by weight | 97.5 | 67.0 |
| | Modifier, % by weight | 2.5 | 33.0 |
| Separator 5c | Amount separated off, l/24 h | 133.4 | 4.1 |
| | Solvent, % by weight | 98.8 | 87.0 |
| | Modifier, % by weight | 1.2 | 13.0 |
| Separator 5d | Amount separated off, l/24 h | 65.0 | 292.4 |
| | Solvent, % by weight | 99.3 | 97.3 |
| | Modifier, % by weight | 0.7 | 2.7 |

List of reference numerals

| 1 | Tube reactor |
| 2 | Preheater |
| 3a | Precompressor |
| 3b | After-compressor |
| 3c, 3d | Compressors |
| 4a | High-pressure separator |
| 4b | Low-pressure separator |
| 5a-5d | Separators |
| 6 | Pressure maintenance valve (pressure-actuated valve) |
| 7 | Product valve |
| 8a-8f | Heat exchangers |
| 9 | High-pressure circuit |
| 10 | Low-pressure circuit |
| 11 | Extruder |
| 12a-12c | Feed points |
| 13a-13c | Mixing vessels |
| 14 | Return line |
| 15 | Stock vessel |

We claim:

1. A process for continuously preparing an ethylene homopolymer or copolymer in a high-pressure tube reactor in presence of at least one free-radical polymerization initiator and, optionally, a least one molecular weight regulator at from 120° C. to 350° C. and a pressure from 1000 to 4000 bar, wherein the ethylene homopolymer or copolymer is separated from unpolymerized ethylene and optionally from comonomers in a high-pressure stage at a pressure from 100 to 500 bar and at least one low-pressure stage at a pressure from 1 to 100 bar, the unpolymerized ethylene separated off in the high-pressure stage is separated from any remaining monomeric, oligomeric and/or polymeric constituents and is re-circulated to a first inlet of the tube reactor in a high-pressure circuit, and the unpolymerized ethylene separated off in the low-pressure stage is separated from any remaining monomeric, oligomeric and/or polymeric constituents and is re-circulated to a second inlet of the tube reactor in a low-pressure circuit, wherein the free-radical polymerization initiator is used as a solution in an isoparaffinic solvent, the isoparaffinic solvent comprising a boiling point equal to or less than 160° C., and the isoparaffinic solvent is separated from the monomeric, oligomeric and/or polymeric constituents in the low-pressure circuit, and the isoparaffinic solvent is reused for dissolving the free-radical polymerization initiator.

2. The process of claim 1, wherein the isoparaffinic solvent is separated off in the low-pressure circuit by means of at least one first gas-liquid separator and at least one last gas-liquid separator connected in series, with the temperature being reduced from separator to separator so that the monomeric, oligomeric or polymeric constituents are separated out in a first gas-liquid separator and the isoparaffinic solvent is essentially separated out as liquid in a last gas-liquid separator.

3. The process of claim 1, wherein the isoparaffinic solvent has a boiling point equal to or less than 150° C.

4. The process of claim 1, wherein the isoparaffinic solvent has a boiling point equal to or less than 135° C.

5. The process of claim 1, wherein the isoparaffinic solvent which has been separated off is used without further purification for dissolving the free-radical polymerization initiator.

6. The process of claim 2, wherein the pressure upstream of the last gas-liquid separator is increased such that the isoparaffinic solvent condenses while ethylene monomer is in a gaseous state.

7. The process of claim 1, wherein the isoparaffinic solvent has a spontaneous ignition temperature of at least 250° C.

8. The process of claim 1, wherein the isoparaffinic solvent has a spontaneous ignition temperature of at least 300° C.

9. The process of claim 1, wherein the isoparaffinic solvent is a mixture of which at least one isoparaffin has a boiling point from 100 to 150° C.

10. The process of claim 1, wherein the isoparaffinic solvent is a mixture of which at least one isoparaffin has a boiling point from 110 to 140° C.

\* \* \* \* \*